United States Patent
Wu et al.

(10) Patent No.: US 10,104,153 B2
(45) Date of Patent: Oct. 16, 2018

(54) METHOD AND DEVICE FOR PROCESSING INFORMATION

(71) Applicant: Xiaomi Inc., Beijing (CN)

(72) Inventors: Guizhou Wu, Beijing (CN); Hong Ji, Beijing (CN); Xianzhe Wei, Beijing (CN)

(73) Assignee: Xiaomi Inc., Beijing (CN)

( * ) Notice: Subject to any disclaimer, the term of this patent is extended or adjusted under 35 U.S.C. 154(b) by 159 days.

(21) Appl. No.: 15/142,392

(22) Filed: Apr. 29, 2016

(65) Prior Publication Data

US 2017/0126773 A1 May 4, 2017

(30) Foreign Application Priority Data

Oct. 29, 2015 (CN) .......................... 2015 1 0718289

(51) Int. Cl.
  *G06F 15/16* (2006.01)
  *H04L 29/08* (2006.01)
  *H04L 29/06* (2006.01)

(52) U.S. Cl.
  CPC ............ *H04L 67/02* (2013.01); *H04L 65/608* (2013.01); *H04L 67/104* (2013.01)

(58) Field of Classification Search
  CPC ...... H04L 67/02; H04L 65/608; H04L 67/104
  See application file for complete search history.

(56) References Cited

U.S. PATENT DOCUMENTS

| 2007/0297426 A1 | 12/2007 | Haveson et al. |
| 2012/0124123 A1* | 5/2012 | Pierce .............. H04N 21/25858 709/203 |
| 2012/0236949 A1 | 9/2012 | Keating et al. |

(Continued)

FOREIGN PATENT DOCUMENTS

| CN | 101321274 A | 12/2008 |
| CN | 102118533 A | 7/2011 |

(Continued)

OTHER PUBLICATIONS

Extended European Search Report of European Patent Application No. 16168095.4, from the European Patent Office, dated Dec. 9, 2016.

(Continued)

*Primary Examiner* — June Sison
*Assistant Examiner* — Steven Nguyen
(74) *Attorney, Agent, or Firm* — Finnegan, Henderson, Farabow, Garrett & Dunner LLP

(57) ABSTRACT

A method and device for processing information are provided. The method includes: judging whether a screen-sharing request from a peer device is received via a wireless network transmission link; when it is judged that the screen-sharing request from the peer device is received, obtaining an Internet Protocol (IP) address and a port number of the peer device; generating, according to the IP address and the port number, a Uniform Resource Locator (URL) corresponding to media data that is used for playing screen content of the peer device; determining a standard player corresponding to the URL; and playing the media data corresponding to the URL using the standard player.

9 Claims, 13 Drawing Sheets

(56) References Cited

U.S. PATENT DOCUMENTS

| | | | |
|---|---|---|---|
| 2014/0347433 A1* | 11/2014 | Kafle | .................. H04L 65/1069 348/14.02 |
| 2014/0365611 A1 | 12/2014 | Praveenkumar et al. | |
| 2015/0095510 A1 | 4/2015 | Bhorkar et al. | |
| 2015/0120958 A1 | 4/2015 | Zou et al. | |
| 2015/0172757 A1 | 6/2015 | Kafle et al. | |
| 2015/0222474 A1 | 8/2015 | Hartley et al. | |
| 2015/0295982 A1* | 10/2015 | Kafle | .................. H04L 65/1083 709/219 |
| 2015/0327313 A1* | 11/2015 | Kim | ...................... H04W 80/10 370/329 |
| 2016/0219606 A1* | 7/2016 | Amano | .............. H04N 1/00217 |

FOREIGN PATENT DOCUMENTS

| | | |
|---|---|---|
| CN | 102404638 A | 4/2012 |
| CN | 103430566 A | 12/2013 |
| CN | 104219551 A | 12/2014 |
| CN | 105430433 A | 3/2016 |
| KR | 20140016332 A | 2/2014 |
| KR | 20150033668 A | 4/2015 |

OTHER PUBLICATIONS

Partial European Search Report of European Patent Application No. 16168095.4, from the European Patent Office, dated Sep. 15, 2016.

English version of International Search Report of PCT/CN2015/099972, mailed from the State Intellectual Property Office of China dated Aug. 4, 2016.

International Search Report of PCT/CN2015/099972, mailed from the State Intellectual Property Office of China dated Aug. 4, 2016.

Office Action issued in Chinese Patent Application No. 201510718289.5, dated Dec. 4, 2017.

Office Action issued in Japanese Patent Application No. 2016-543665, dated Jan. 19, 2018.

Introduction to Android Application Development, dated Jul. 13, 2015, Xiang Yong Agency Ltd., Japan, First Edition, pp. 158-166.

* cited by examiner

| Application Layer: | WFD-Defined Extension Protocol: | RTSP | RTP (for Data Only) |
|---|---|---|---|
| Transmission Layer: | TCP | | UDP (for Data Only) |
| Network Layer: | IP | | |
| Data Link Layer: | WFD-Defined Extension Protocol: | WiFi(802.11) | |

Fig. 1

METHOD AND DEVICE FOR PROCESSING INFORMATION

CROSS-REFERENCE TO RELATED APPLICATIONS

This application is based upon and claims priority to Chinese Patent Application No. 201510718289.5, filed Oct. 29, 2015, the entire contents of which are incorporated herein by reference.

TECHNICAL FIELD

The present disclosure generally relate to the communication technology and, more particularly, to a method and device for processing information.

BACKGROUND

Wireless Fidelity display (WiFi-display) technology is used for real-time sharing of resources (such as pictures, videos, or music) between different User Equipment (UE) based on WiFi Direct. During such sharing, the resources can be transmitted, through a WiFi connection, from a sending terminal (hereinafter referred to as "Source end") to a receiving terminal (hereinafter referred to as "Sink end") for playing, without requiring hardware connection. For example, by using the WiFi-display technology, videos currently played on a mobile phone can be simultaneously played on a large-screen television (TV).

In the current WiFi-display technology, after the Source end transmits resource data to be played to the Sink end, the Sink end directly plays the received resource data. Thus, the transmission and the playing of the resource data are not independent from each other. If the communication protocol adopted by the Source end and the Sink end for transmitting data changes, the transmitted data may not be played properly at the Sink end.

SUMMARY

According to a first aspect of the present disclosure, there is provided a method for a terminal to process information, comprising: judging whether a screen-sharing request from a peer device is received via a wireless network transmission link; when it is judged that the screen-sharing request from the peer device is received, obtaining an Internet Protocol (IP) address and a port number of the peer device; generating, according to the IP address and the port number, a Uniform Resource Locator (URL) corresponding to media data that is used for playing screen content of the peer device; determining a standard player corresponding to the URL; and playing the media data corresponding to the URL using the standard player.

According to a second aspect of the present disclosure, there is provided a terminal, comprising: a processor; and a memory configured to store instructions executable by the processor; wherein the processor is configured to: judge whether a screen-sharing request of a peer device is received via a wireless network transmission link; when it is judged that the screen sharing request of the peer device is received, obtain an Internet Protocol (IP) address and a port number of the peer device; generate, according to the IP address and the port number, a Uniform Resource Locator (URL) corresponding to media data that is used for playing screen content of the peer device; determine a standard player corresponding to the URL; and play the media data corresponding to the URL using the standard player.

According to a third aspect of the present disclosure, there is provided a non-transitory computer-readable storage medium storing instructions that, when executed by a processor of a terminal, cause the terminal to perform a method for processing information, the method comprising: judging whether a screen-sharing request from a peer device is received via a wireless network transmission link; when it is judged that the screen-sharing request from the peer device is received, obtaining an Internet Protocol (IP) address and a port number of the peer device; generating, according to the IP address and the port number, a Uniform Resource Locator (URL) corresponding to media data that is used for playing screen content of the peer device; determining a standard player corresponding to the URL; and playing the media data corresponding to the URL using the standard player.

It is to be understood that both the foregoing general description and the following detailed description are exemplary and explanatory only and are not restrictive of the invention, as claimed.

BRIEF DESCRIPTION OF THE DRAWINGS

The accompanying drawings herein, which are incorporated into and constitute a part of this specification, illustrate embodiments consistent with the present disclosure, and together with the description, serve to explain the principles of the present disclosure.

FIG. 1 is a schematic diagram illustrating a communication protocol hierarchy, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

The Android 4.2 operating system, developed by Google, adds a support for the WiFi Display (WFD) function. Miracast is a certification name provided by the WiFi Alliance for devices supporting the WFD function. Devices passing the Miracast certification support and are compatible with the WFD function.

A core function of Miracast is to make devices share video and/or audio data through a WiFi network. For example, with Miracast, videos in a mobile phone can be transmitted via WiFi to a TV for displaying, without requiring additional hardware such as a High Definition Multimedia Interface (HDMI). In view of the current development trend of smart devices, the WFD function likely can help to realize the multi-screen interaction in the near future. The WFD protocol extends WiFi and a Real Time Streaming Protocol (RTSP), by defining a series of parameters and message types on the basis of the RTSP. The WFD protocol performs the underlying transport through a customized function of Information Element of WiFi. FIG. 1 is a schematic diagram illustrating a hierarchy of the WFD protocol, according to an exemplary embodiment.

Figure 2:
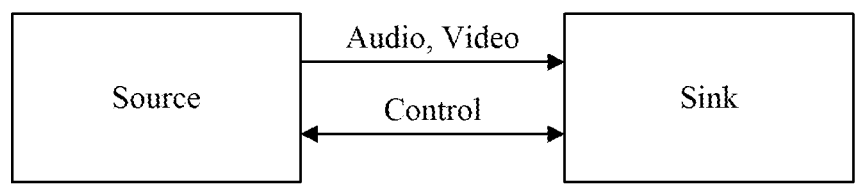
FIG. 2 is a schematic diagram illustrating data transmission between a Source end and a Sink end, according to an exemplary embodiment.

FIG. 2 is a schematic diagram illustrating data transmission between a Source end and a Sink end, according to exemplary embodiment. Referring to FIG. 2, the WFD protocol specifies that there should be at least one Source device (i.e., the Source end) and at least one Sink device (i.e., the Sink end), which are also called WFD Source and WFD Sink, respectively. The Source end is the sending terminal of resources, and the Sink end is the receiving terminal of the resources. In the illustrated embodiment, Miracast manages interactions between two devices by sessions. Steps of Miracast session management are described below in a chronological order. For illustrative purposes only, the steps are discussed from the perspective of the Source end. It should be understood, however, these steps can also be implemented by the Sink end.

Device discovery: The Source end, through the WiFi Peer-to-Peer (P2P) method, searches for a nearby device supporting WiFi P2P.

Device selection: After the Source end discovers a Sink end, the Source end prompts a user to choose whether to pair the Source end with the Sink end.

Connection setup: The Source end and a display device at the Sink end, through the WiFi P2P, establish a connection between each other. According to the technical specification of WiFi Direct, this step includes setting up a group owner and a client. After that, the Source end sets up a Transmission Control Protocol (TCP) connection with the display device. Meanwhile, the Source end sets up an RTSP port used for subsequent session management and control.

Capability negotiation: Before the video and/or audio data is transmitted, the Source end and the display device need to exchange certain Miracast parameter information, such as the video and/or audio formats supported by both the Source end and the display device. In the illustrated embodiment, only after the negotiation is successful, the following steps of the Miracast session management can be continued.

Session establishment and streaming: After the above-described steps are completed, the Source end and the display device establish a Miracast session, such that the video and/or audio data can be transmitted. The Source end may encode the video and/or audio data based on, e.g., a Moving Picture Experts Group Transport Stream (MPEG2TS), and then transmit the encoded data to the display device using the Real-time Transport Protocol (RTP). The display device decodes the received data and displays the decoded data.

However, in the above-described native Miracast solution, the Android Application Package (APK) layer is mixed with the setting, and the middle layer is mixed with the WiFi P2P. Thus, the logic flow is not clear and thus is not convenient to decouple or maintain. Since the Miracast session management can be divided into a linking part and a playing part that are coupled with each other, once the situation in the linking part changes, the operation of the playing part will be affected. For example, if, instead of using the WiFi P2P protocol, the Source end uses a Universal Plug and Play (UPnP)/Microsoft Developer Network (MSDN) or a private discovery protocol to discover other devices, then the playing part may fail to run properly because the underlying RTSP protocol remains unchanged.

The native Miracast solution mixes the RTSP-server linking process with the WiFi P2P linking process. Thus, the Sink end starts the playing part immediately after obtaining the IP address and the port number of the Source end. However, considering the playing part and the linking part are only directly related by an IP address and a port number, to achieve the independence of the playing part and the linking part from each other, it is possible to send, by means of Intent, the IP address and the port number of the Source end to various applications for performing the subsequent operations. Accordingly, the present disclosure discloses methods and devices to decouple the linking part from the playing part, such that the playing part is made independent from the linking part, without being affected by changes in the linking part. The specific methods and devices are described in the following embodiments.

Figure 3:
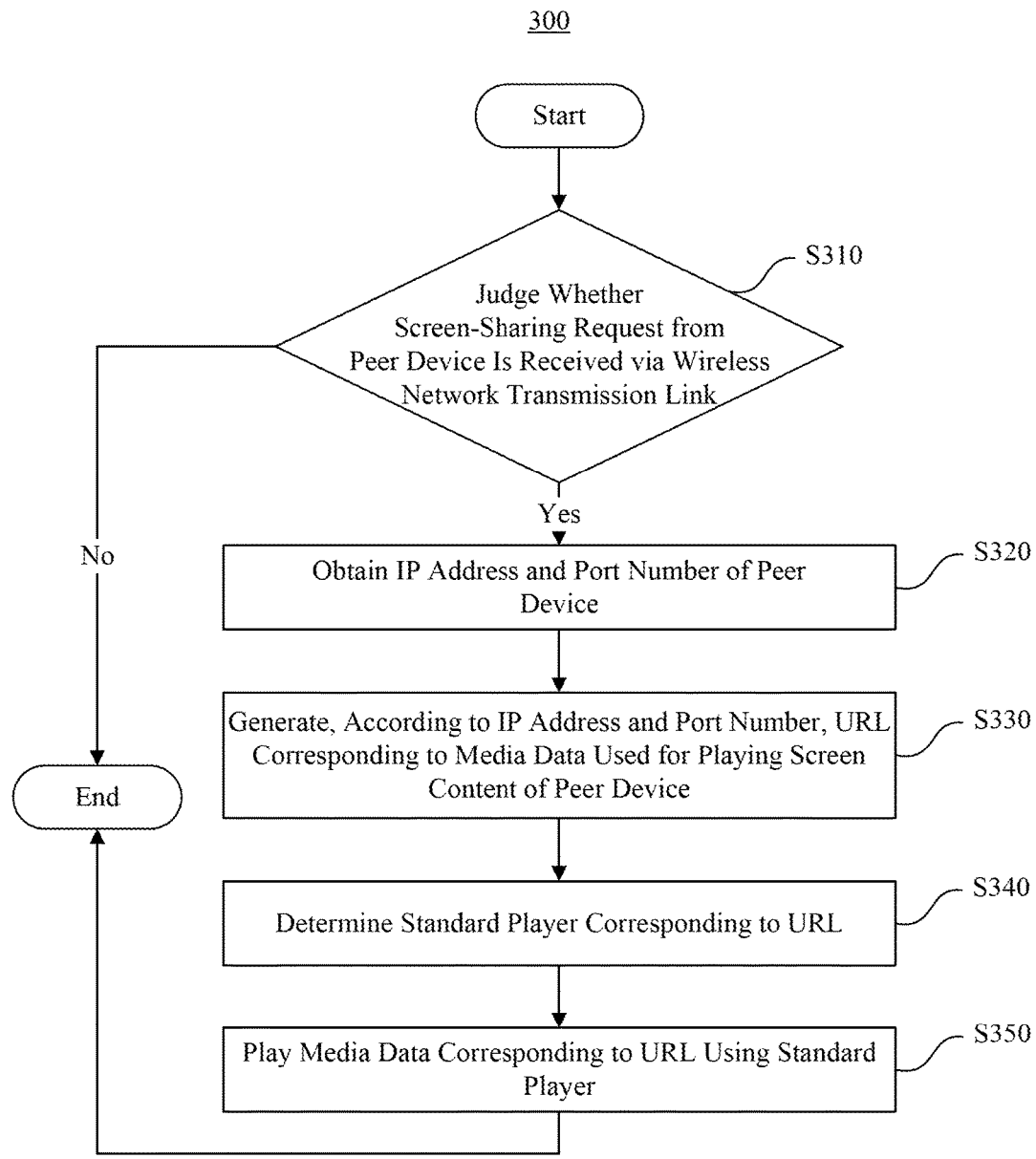
FIG. 3 is a flowchart of a method for processing information, according to an exemplary embodiment.

FIG. 3 is a flowchart of a method 300 for processing information, according to an exemplary embodiment. For example, the method 300 may be used in a Sink end. Referring to FIG. 3, the method 300 may include the following steps.

In step S310, the Sink end judges whether a screen-sharing request from a peer device is received via a wireless network transmission link.

For example, a Source end and the Sink end are peer devices to each other. The Source end may use the WiFi P2P to look for a nearby device supporting the WiFi P2P. In some embodiments, the Source end may also use other protocols, such as the private discovery protocol, to find a peer device. When the Source end discovers the Sink end, the Source end and the Sink end may establish a communication connection by using a network transport protocol that is supported by both Source end and Sink end. When the Source end needs to play media data at the Sink end in real time to realize the screen sharing, the Source end may send a screen-sharing request to the Sink end through the established communication connection.

In step 320, when the screen-sharing request from the peer device is received, the Sink end obtains an IP address and a port number of the peer device.

As described in step 310, the Source end is a peer device of the Sink end. Thus, the IP address and the port number of the peer device are the IP address and the port number of the Source end.

In step S330, the Sink end generates, according to the IP address and the port number, a Uniform Response Locator (URL) corresponding to media data that is used for playing screen content of the peer device.

The URL is generated according to the IP address and the port number of the Source end. A format type of the URL can be in the WFD format type.

In step S340, the Sink end determines a standard player corresponding to the URL.

The standard player should support the format type of the URL, such that the standard player can play the media data corresponding to the URL. There may be two ways of determining the standard player corresponding to the URL. In a first way, the Sink end converts a pre-existing player to the standard player. In the second way, the Sink end creates a new player that supports the format type of the URL.

In step S350, the Sink end uses the standard player to play the media data corresponding to the URL.

By using the standard player to play the media data corresponding to the URL, the Sink end may play in real time the media data transmitted by the Source end.

According to the method 300, when a Sink end receives a screen-sharing request sent by a Source end, the Sink end obtains the IP address and the port number of the Source end, and generates a URL corresponding to the media data sent by the Source end. The Sink end then determines a standard player corresponding to the URL, and plays the media data using the standard player. The standard player used by the Sink end may be an independent standard player. Thus, even if the communication protocol used by the Source end and the Sink end for exchanging data changes, the standard player at the Sink end can still properly play the media data sent by the Source end.

Figure 4:
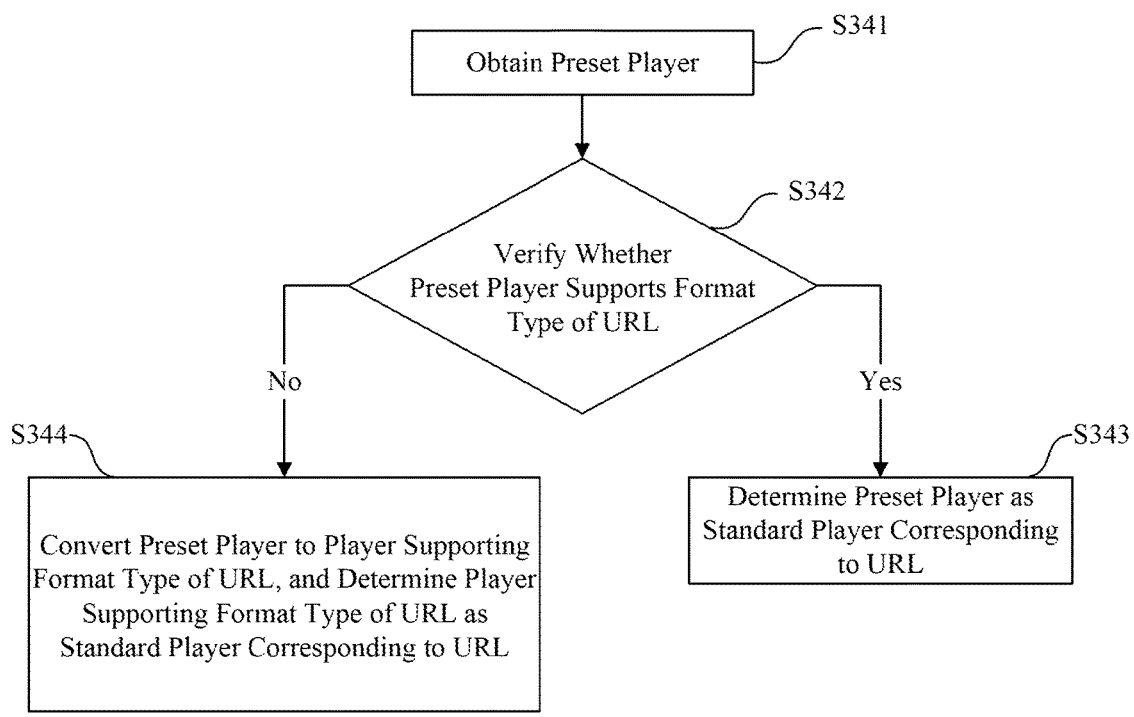
FIG. 4 is a flowchart of a step in the method of FIG. 3, according to an exemplary embodiment.

FIG. 4 is a flowchart of step S340 in the method 300 of FIG. 3, according to an exemplary embodiment. Referring to FIG. 4, step S340 may further include the following sub-steps.

In sub-step S341, the Sink end obtains a preset player.

The preset player may be a pre-existing player. In practice, the Sink end may directly call the preset player.

In sub-step S342, the Sink end verifies whether the preset player supports the format type of the URL.

The URL may have the WFD format type, e.g., "wfd:// xxx URL."

In sub-step S343, when the preset player supports the format type of the URL, the Sink end determines the preset player as a standard player corresponding to the URL.

In practice, if the preset player, i.e., the pre-existing player, supports the format type of the URL, the Sink end may directly use the preset player without modifying the preset player.

In sub-step S344, when the preset player does not support the format type of the URL, the Sink end converts the preset player to a player supporting the format type of the URL, and determines the player supporting the format type of the URL as the standard player corresponding to the URL.

In one embodiment, the Sink end obtains, based on a RTP sink, video and/or audio data and then starts, in TunnelRender, a pre-existing player to play the video and/or audio data. Since there are standardized players and interfaces for playing the video and/or audio data, the Sink end only needs to follow a uniform process to distribute the setups and settings of a surface or the like to corresponding interfaces in the MediaPlayerService architecture. Moreover, since this method can use the flow of "WiFiDisplaySink→RTPReceiver→TunnelRenderer," the method initiates the actual player of the video and/or audio data in the TunnelRenderer object, and starts the playing flow by calling function interfaces such as setDataSource ( ) setVideoSurfaceTexture ( ) start ( ) etc.

However, as described above, the problem of the above method lies in that the linking part and playing part is not decoupled. That is, the playing part cannot be operated independently from the linking part. To solve this problem, the disclosed embodiments make the top-layer applications automatically identify, based on the URL, the playing type to create a playing flow. To achieve so, the disclosed embodiments put the process of initiating the player into a MediaPlayerService class. Specifically, the disclosed embodiments modify the class member function, i.e., setDataSource, of MediaPlayerService, to enable setDataSource to identify the URL of Miracast. Here, "wfd://xxx" is used to label the playing type as Miracast, so as to distinguish Miracast from other protocols and thus enable the bottom layer to create a correct playing process. During this playing process, the calling of setVideoSurfaceTexture ( ) start ( ), and other similar function interfaces still follow the same standard flow.

By converting a pre-existing player that does not support the format type of the URL to a standard player that supports the format type of the URL, the disclosed embodiments ensure that, even if the data transmission protocol between the Source end and the Sink end changes, the real-time playing of the transmitted media data by the standard player is not affected.

Figure 5:
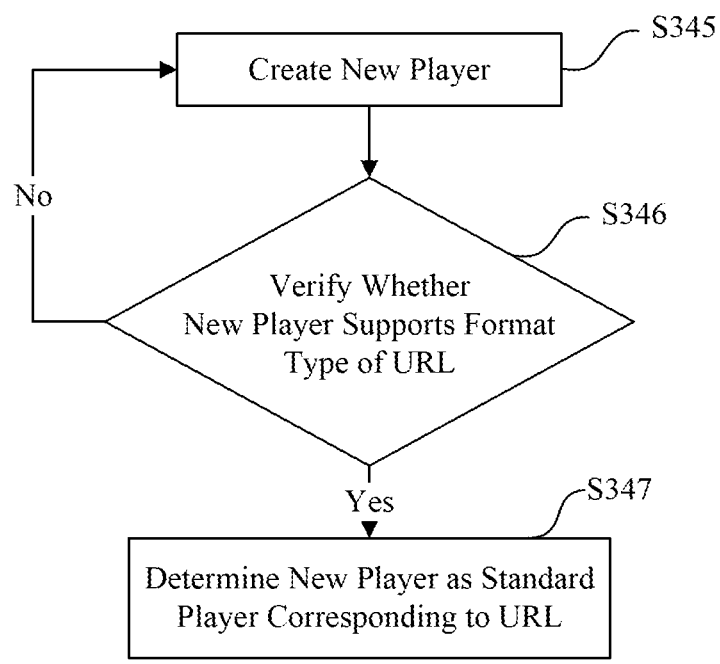
FIG. 5 is a flowchart of a step in the method of FIG. 3, according to an exemplary embodiment.

FIG. 5 is a flowchart of step S340 in the method 300 of FIG. 3, according to another exemplary embodiment. Referring to FIG. 5, step S340 may include the following sub-steps.

In sub-step S345, the Sink end creates a new player.

If the Sink end determines that it currently has no pre-existing player supporting the format type of the URL, the Sink end may create a new player. The new player has a standard interface, and supports the typical standard flows for calling players. The new player supports the format type of the URL, for example, the format type "wfd://xxx URL."

In sub-step S346, the Sink end verifies whether the new player supports the format type of the URL.

After creating the new player, the Sink end also needs to verify whether the new player supports the format type of the URL, to ensure the new player can properly play the media data corresponding to the URL.

In sub-step S347, when the new player supports the format type of the URL, the Sink end determines the new player as a standard player corresponding to the URL.

The standard player can be created using a method of directly decoding and playing the video and/or audio data from Mediareceiver to Directrender, i.e., WiFiDisplaySink→MediaReceiver→DirectRenderer. Although this method has a playing workflow, the playing flow does not conform with the flow of the standard Android player. A disadvantage of this method is that the standard interfaces, such as setDataSource and setVideoSurfaceTexture, of the player base class MediaPlayerinterface are not realized. Moreover, for Wireless Display (WiDi), when the Source end changes the resolutions of the video data, this method is unable to inform the applications to timely switch the resolutions, which, for example, may causes that a mouse does not match a video.

To solve the above-described problems, the disclosed embodiments create a new player class that is named as, e.g., FakeMiracastPlayer. This new player class is transparent to the application layer. The application layer can call the standard flow of MediaPlayer, and the bottom layer still has the original framework. That is, the FakeMiracastPlayer class plays a role of bridge, such that a top layer starts the FakeMiracastPlayer through the format type "wfd://xxx URL," and a bottom layer informs the application layer of the occurrence of an event also through the format type "wfd://xxx URL."

Moreover, the FakeMiracastPlayer calls the original WiFiDisplay through the standard setDataSource interface, and transmits the entity of a top-layer player to the WiFiDisplay through a setListener interface, so as to obtain a message feedback in the WiFiDisplay. and the FakeMiracastPlayer also transmits, through setWfdSurface, the standard surface to the WiFiDisplay for encoding, decoding, and displaying. In this way, the interfaces and flows can be kept uniform.

With continued reference to FIG. 5, in step 340, the Sink end may create a standard player that supports the format type of the URL, and verify whether the standard player supports the format type of the URL. When the standard player supports the format type of the URL, even if the data transmission protocol adopted by the Source end and the Sink end changes, the real-time playing of the transmitted media data by the standard player is not affected.

Figure 6:
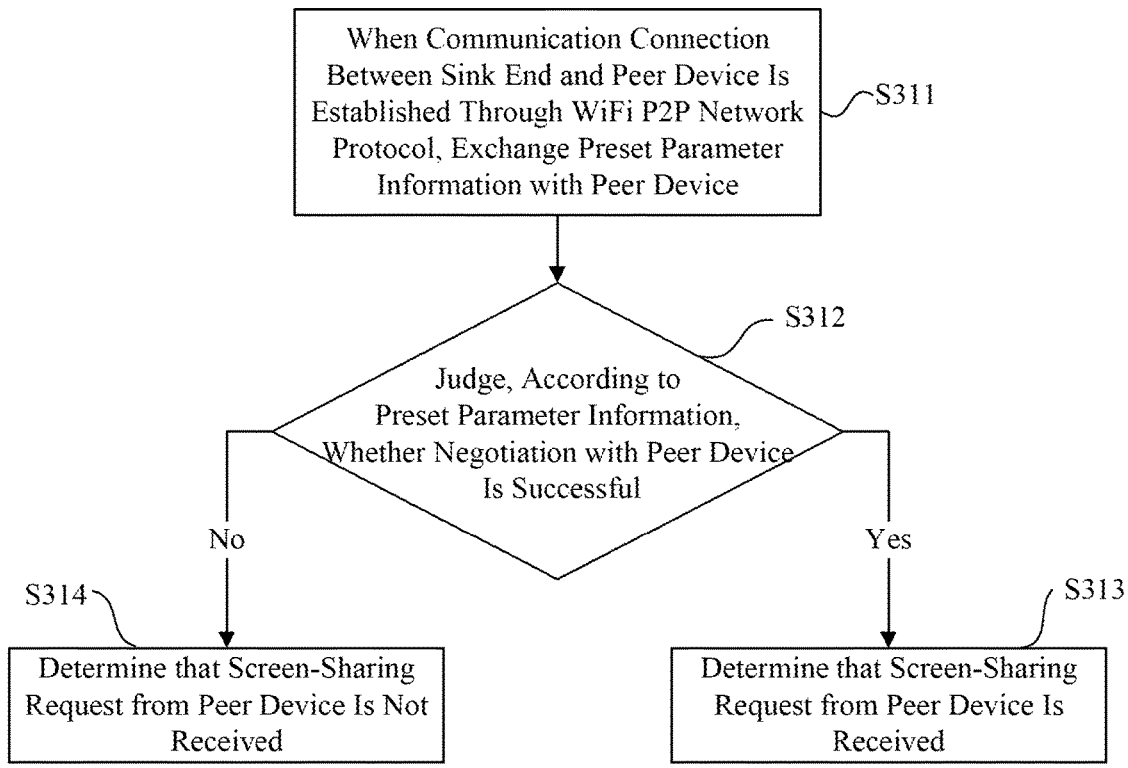
FIG. 6 is a flowchart of a step in the method of FIG. 3, according to an exemplary embodiment.

FIG. 6 is a flowchart of step S310 in the method 300 of FIG. 3, according to an exemplary embodiment. Referring to FIG. 6, step S310 may further include the following substeps.

In sub-step S311, when the communication connection between the Sink end and the peer device is established using the WiFi P2P network protocol, the Sink end exchanges preset parameter information with the peer device.

The preset parameter information may be Miracast parameter information, such as the video/audio format supported by the Source end and the Sink end.

In sub-step S312, the Sink end judges, according to the preset parameter information, whether a negotiation with the peer device is successful.

After the Source end and the Sink end exchange the preset parameter information, one or both ends may use the exchanged preset parameter information to judge whether the format is supported by the devices at each end, namely, whether the negotiation is successful.

In sub-step S313, when the negotiation with the peer device is successful, the Sink end determines that the screen-sharing request from the peer device is received.

In sub-step S314, when the negotiation with the peer device fails, the Sink end determines that the screen-sharing request from the peer device is not received.

In this embodiment, the Source end and the Sink end negotiate to judge whether the condition of data transmission is met, thereby avoiding the situation that after receiving the media data from the Source end, the Sink end cannot properly play the media data due to the data format or other reasons.

Figure 7:
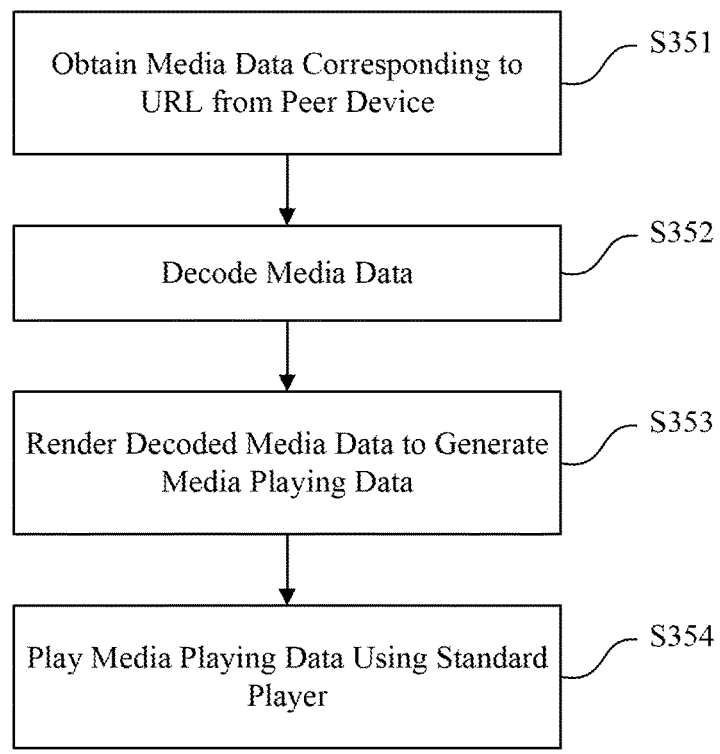
FIG. 7 is a flowchart of a step in the method of FIG. 3, according to an exemplary embodiment.

FIG. 7 is a flowchart of step S350 in the method 300 of FIG. 3, according to an exemplary embodiment. Referring to FIG. 7, step S350 may further include the following substeps.

In sub-step S351, the Sink end obtains the media data corresponding to the URL. The media data is provided by the Source end.

In sub-step S352, the Sink end decodes the media data.

In sub-step S353, the Sink end renders the decoded media data to generate media playing data.

In sub-step S354, the Sink end plays the media playing data using the standard player.

In practice, after obtaining the URL corresponding to the media data, The Sink end parses the URL and then obtains the corresponding media data according to the parsed URL. For example, after the URL is parsed, the Source end transmits, through an established session, the real-time media stream (or the captured screen interface) to the Sink end in the manner of transport stream (TS). The Sink end encodes and demultiplexes the media stream data (e.g., audios and/or videos), and then transmits the media stream data to the standard player for decoding, rendering, and playing.

According to the disclosed methods for processing information, when the Sink end receives a screen-sharing request sent by the Source end, the Sink end obtains the IP address and the port number of the Source end, and generates a URL. The Sink end further determines a standard player corresponding to the URL, and plays, using the standard player, media data sent by the Source end. Because the standard player at the Sink end is an independent standard player, even if the data transmission protocol adopted by the Source end and the Sink end changes, the standard player at the Sink end can still properly play the media data.

The disclosed methods provide two ways of determining the standard player. The standard player is independent from the linking part. Thus, the standard player's playing of the media data is not affected by changes of the data transmission protocol. Accordingly. the playing efficiency is significantly improved. In addition, the disclosed methods may use unified standard APK interfaces. Thus, the methods are able to conveniently adapt to the changes of the data transmission protocol. and solve the problem of mismatch between the video and the mouse when the resolutions of the video change.

The disclosed methods can be implemented by software, or hardware, or a combination of both. When software is used, instructions for performing part or all of the steps in the disclosed methods can be stored in a storage medium. The instructions make a computer device, such as a personal computer, a server, or a network device, perform all or part of the steps in the methods. The storage medium may include a Read-Only Memory (ROM), a Random Access Memory (RAM), a magnetic disk or an optical disk, and other storage medium that can store program codes.

Figure 8:
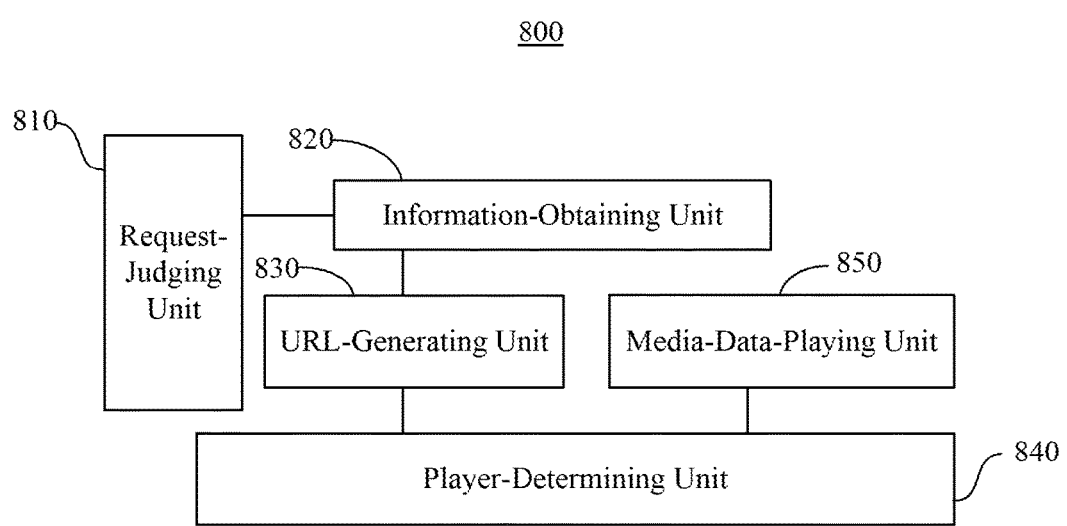
FIG. 8 is a block diagram of a device for processing information, according to an exemplary embodiment.

FIG. 8 is a block diagram of a device 800 for processing information, according to an exemplary embodiment. For example, the device 800 may be implemented as part or whole of a terminal, such as a mobile phone or a computer. Referring to FIG. 8, the device 800 includes a request-judging unit 810, an information-obtaining unit 820, a URL-generating unit 830, a player-determining unit 840, and a media-data-playing unit 850.

The request-judging unit 810 is configured to judge whether a screen-sharing request of a peer device is received via a wireless network transmission link.

The information-obtaining unit 820 is configured to, when the screen-sharing request of the peer device is received, obtain an IP address and a port number of the peer device.

The URL-generating unit 830 is configured to, according to the IP address and the port number, generate a URL corresponding to media data used for playing screen content of the peer device.

The player-determining unit 840 is configured to determine a standard player corresponding to the URL.

The media-data-playing unit 850 is configured to play, using the standard player, the media data corresponding to the URL.

Figure 9:
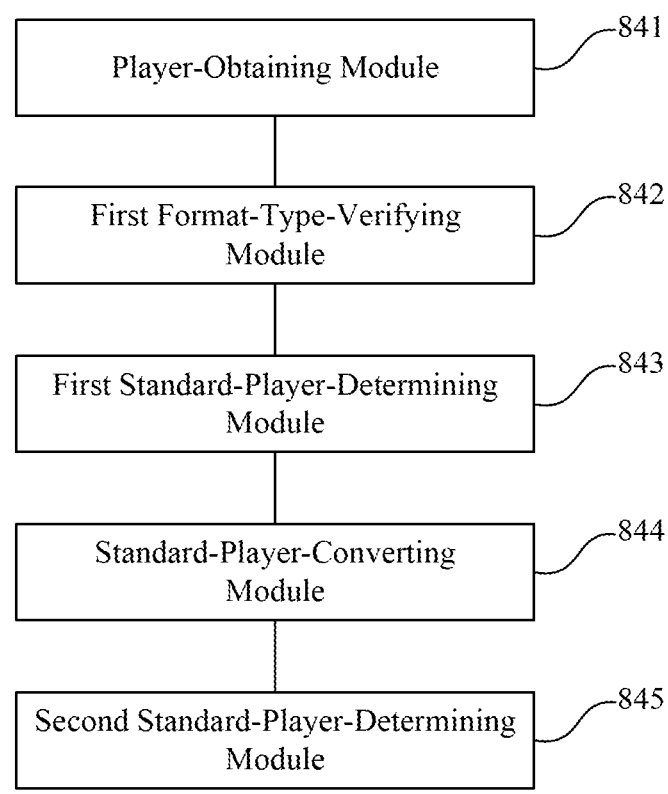
FIG. 9 is a block diagram of a player-determining unit, according to an exemplary embodiment.

FIG. 9 is a block diagram of the player-determining unit 840 (FIG. 8), according to an exemplary embodiment. Referring to FIG. 9, the player-determining unit 840 includes a player-obtaining module 841, a first format-typeverifying module 842, a first standard-player-determining module 843, a standard-player-converting module 844, and a second standard-player-determining module 845.

The player-obtaining module 841 is configured to obtain a preset player.

The first format-type-verifying module 842 is configured to verify whether the preset player supports a format type of the URL.

The first standard-player-determining module 843 is configured to, when the preset player supports the format type of the URL, determine the preset player as the standard player corresponding to the URL.

The standard-player-converting module 844 is configured to, when the preset player does not support the format type of the URL, convert the preset player to a player supporting the format type of the URL.

The second standard-player-determining module 845 is configured to determine the player supporting the format type of the URL as the standard player corresponding to the URL.

Figure 10:
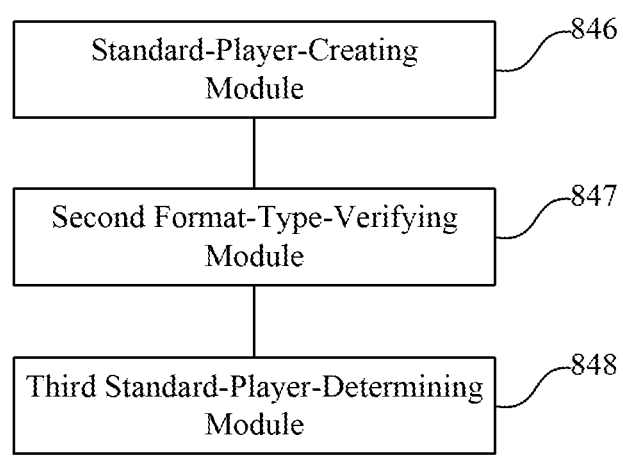
FIG. 10 is a block diagram of a player-determining unit, according to an exemplary embodiment.

FIG. 10 is a block diagram of the player-determining unit 840 (FIG. 8), according to another exemplary embodiment. Referring to FIG. 10, the player-determining unit 840 includes a standard-player-creating module 846, a second format-type-verifying module 847, and a third standard-player-determining module 848.

The standard-player-creating module 846 is configured to create a new player.

The second format-type-verifying module 847 is configured to verify whether the new player supports the format type of the URL.

The third standard-player-determining module 848 is configured to, when the new player supports the format type of the URL, determine the new player as the standard player corresponding to the URL.

Figure 11:
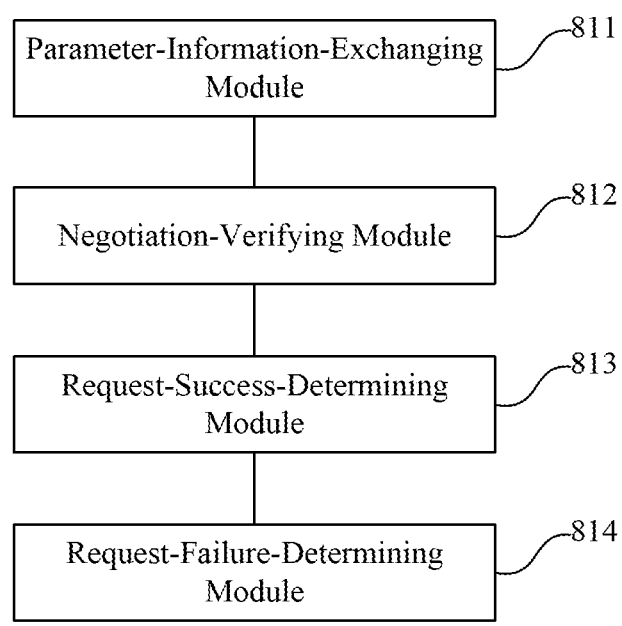
FIG. 11 is a block diagram of a request-judging unit, according to an exemplary embodiment.

FIG. 11 is a block diagram of the request-judging unit 810 (FIG. 8), according to an exemplary embodiment. Referring to FIG. 11, the request-judging unit 810 includes a parameter-information-exchanging module 811, a negotiation-verifying module 812, a request-success-determining module 813, and a request-failure-determining module 814.

The parameter-information-exchanging module 811 is configured to, when a communication connection between the device 800 and the peer device is established through a WiFi P2P network protocol, exchange preset parameter information with the peer device.

The negotiation-verifying module 812 is configured to verify, according to the preset parameter information, whether the negotiation with the peer device is successful.

The request-success-determining module 813 is configured to, when the negotiation with the peer device is successful, determine that the screen-sharing request from the peer device is received.

The request-failure-determining module 814 is configured to, when the negotiation with the peer device fails, determine that the screen-sharing request of the peer device is not received.

Figure 12:
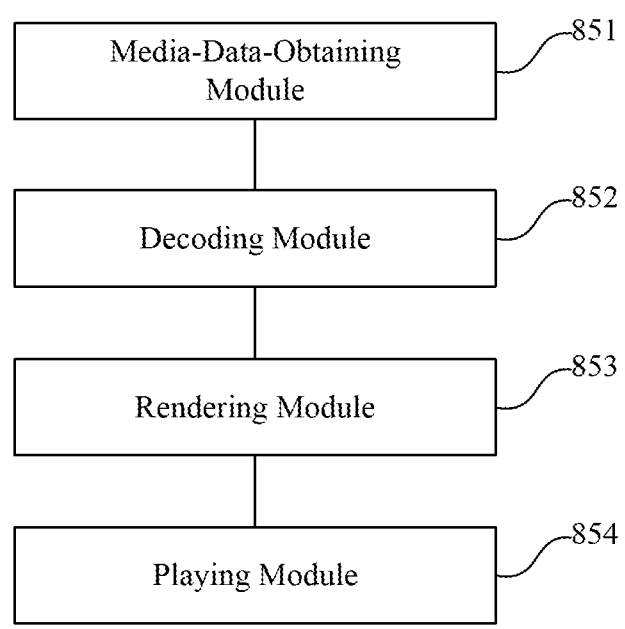
FIG. 12 is a block diagram of a media-data-playing unit, according to an exemplary embodiment.

FIG. 12 is a block diagram of the media-data-playing unit 850 (FIG. 8), according to an exemplary embodiment. Referring to FIG. 12, the media-data-playing unit 850 includes a media-data-obtaining module 851, a decoding module 852, a rendering module 853, and a playing module 854.

The media-data-obtaining module 851 is configured to obtain the media data corresponding to the URL.

The decoding module 852 is configured to decode the media data.

The rendering module 853 is configured to render the decoded media data to generate media playing data.

The playing module 854 is configured to play the media playing data using the standard player.

With respect to the devices in the above embodiments, the specific manners for individual modules/units to perform operations have been described in detail in the embodiments regarding the methods, which will not be elaborated herein.

Figure 13:
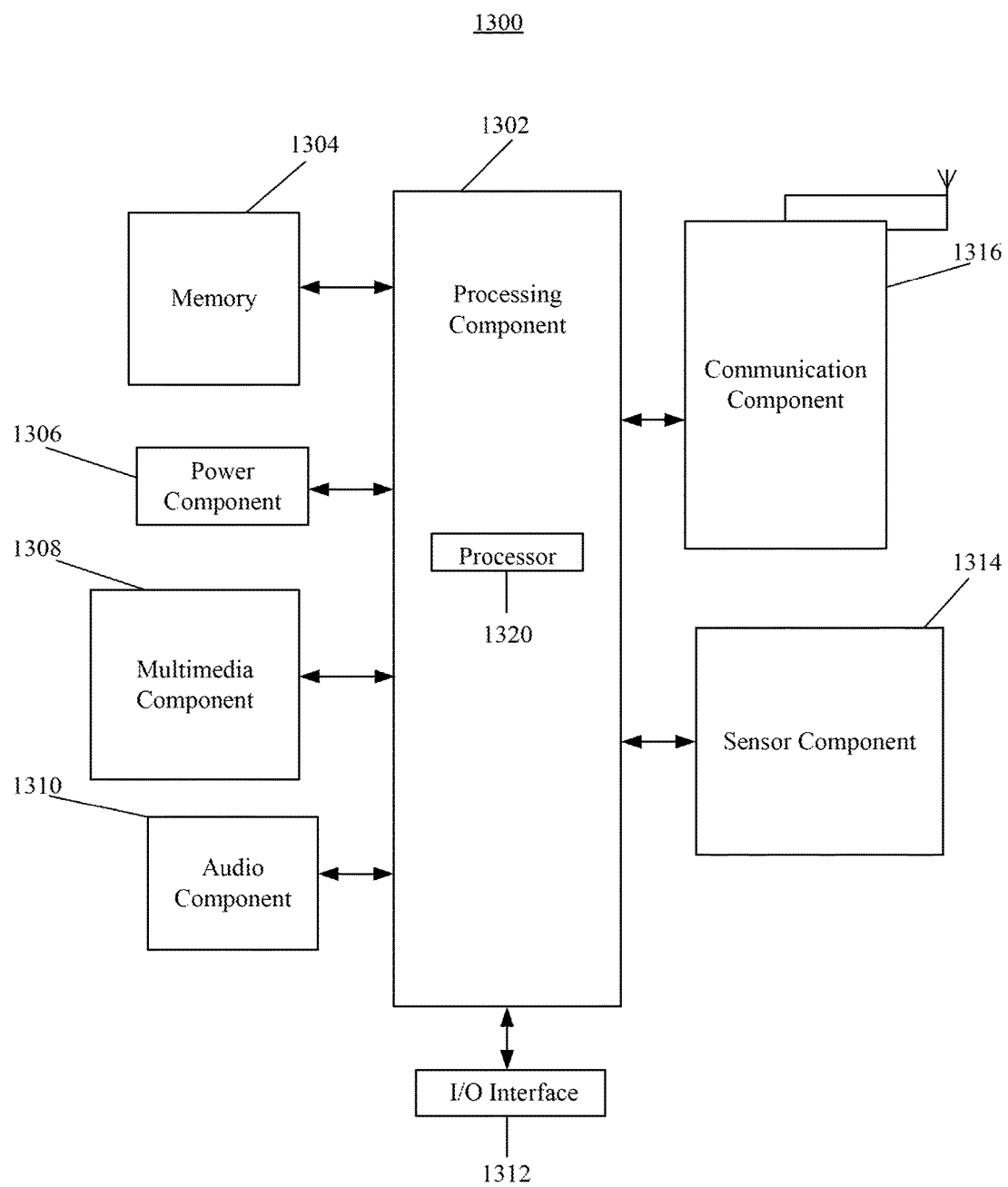
FIG. 13 is a block diagram of a terminal for processing information, according to an exemplary embodiment.

FIG. 13 is a block diagram of a terminal 1300 for processing information, according to an exemplary embodiment. For example, the terminal 1300 may be a mobile phone, a computer, a digital broadcasting terminal, a message transceiver, a game console, a tablet device, medical equipment, fitness equipment, a personal digital assistant, and so on.

Referring to FIG. 13, the terminal 1300 may include one or more following components: a processing component 1302, a memory 1304, a power component 1306, a multimedia component 1308, an audio component 1310, an input/output (I/O) interface 1312, a sensor component 1314, and a communication component 1316.

Generally, the processing component 1302 controls the overall operations of the terminal 1300, such as the operations associated with display, phone calls, data communications, camera operations and recording operations. The processing component 1302 may include one or more processors 1320 to execute instructions to perform all or part of the steps in the above-described methods. In addition, the processing component 1302 may include one or more modules to facilitate interaction between the processing component 1302 and other components. For example, the processing component 1302 may include a multimedia module to facilitate interaction between the multimedia component 1308 and the processing component 1302.

The memory 1304 is configured to store various types of data to support the operation of the terminal 1300. Examples of such data include instructions of any applications or methods operated on the terminal 1300, contact data, telephone directory data, messages, pictures, video, etc. The memory 1304 can be implemented using any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read Only Memory (PROM), a ROM, a magnetic memory, a flash memory, a magnetic disk, or an optical disk.

The power component 1306 provides power for each component of the terminal 1300. The power component 1306 may include a power management system, one or more power sources, and any other components associated with the generation, management, and distribution of power in the device 1300.

The multimedia component 1308 includes a screen which provides an output interface between the terminal 1300 and the user. In some embodiments, the screen may include a liquid crystal display (LCD) and/or a touch panel (TP). If the screen includes the TP, then the screen may be implemented as a touch screen to receive an input signal from the user. The TP includes one or more touch sensors for sensing touches, swipes, and gestures on the touch panel. The touch sensor can not only sense a boundary of a touch or slide operation, but also detect duration and pressure related to the touch or slide operation. In some embodiments, the multimedia component 1308 includes a front camera and/or a rear camera. When the terminal 1300 is in an operation mode, e.g., a photographing mode or a video mode, the front camera and/or the rear camera may receive external multimedia data. Each of the front camera and rear camera can be a fixed-focus optical lens system or have a focal length and optical zoom capability.

The audio component 1310 is configured to output and/or input an audio signal. For example, the audio component 1310 includes a microphone configured to receive an external audio signal when the terminal 1300 is in the operation mode, such as a calling mode, a recording mode, and a voice recognition mode. The received audio signal may be further stored in the memory 1304 or sent via the communication component 1316. In some embodiments, the audio component 1310 also includes a loudspeaker for outputting the audio signal.

The I/O interface 1312 provides an interface between the processing component 1302 and peripheral interface modules, such as a keyboard, a click wheel, buttons, etc. The buttons may include, but are not limited to, a home button, a volume button, a start button, and a locking button.

The sensor component 1314 includes one or more sensors to provide status assessments of various aspects of the terminal 1300. For example, the sensor component 1314 can detect an open/close state of the terminal 1300 and relative positioning of components, e.g., a display and a keypad, of the terminal 1300. The sensor component 1314 can also detect a position change of the terminal 1300 or a component of the terminal 1300, a presence or absence of contact between the user and the terminal 1300, an orientation or an acceleration/deceleration or the terminal 1300, and a temperature change of the terminal 1300. The sensor component 1314 may include a proximity sensor configured to detect the presence of nearby objects without any physical contact. The sensor component 1314 may also include an optical sensor, such as a Complementary Metal-Oxide Semiconductor (CMOS) or a Charge Coupled Device (CCD) image sensor, for use in imaging applications. In some embodiments, the sensor component 1314 may also include an acceleration sensor, a gyroscope sensor, a magnetic sensor, a pressure sensor, or a temperature sensor.

The communication component 1316 is configured to facilitate wired or wireless communication between the terminal 1300 and other equipment. The terminal 1300 can access a wireless network based on a communication standard, such as WiFi, 2G, 3G, 4G, or a combination thereof. In an exemplary embodiment, the communication component 1316 receives, via a broadcast channel, a broadcast signal or broadcast related information from an external broadcast management system. In an exemplary embodiment, the communication component 1316 also includes a Near Field Communication (NFC) module for facilitating short range communication. For example, the NFC module can be realized based on the Radio Frequency Identification (RFID) technology, the Infrared Data Association (IrDA) technology, the Ultra Wideband (UWB) technology, the Bluetooth (BT) technology, and other technologies.

In an exemplary embodiment, the terminal 1300 may be implemented by one or more of an application specific integrated circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, for performing the above methods.

In an exemplary embodiment, there is also provided a non-transitory computer-readable storage medium including instructions, such as included in the memory 1304, executable by the processor 1320 of the terminal 1300, for performing the above-described methods. For example, the non-transitory computer-readable storage medium can be a ROM, a RAM, a CD-ROM, a magnetic tape, a floppy disk, an optical data storage device, etc.

It is to be understood that the present disclosure can be applied to any general-purpose or dedicated computing system environments or configurations, such as a personal computer, a server, a handheld or portable device, a tablet device, a multi-processor system, a microprocessor-based system, a set-top box, a programmable consumer electronic device, a network computer, a minicomputer, a mainframe computer, and a distributed computing environment including any above system or device.

The embodiments of the present disclosure may be described in the general context of computer-executable instructions that are executed by the computer, for example, a program module. Generally, the program module includes a routine, a program, an object, a component, a data structure, and the like, for performing a specific task or implementing a specific abstract data type. The present disclosure may also be practiced in the distributed computing environments, in which the task is performed by remote processing devices which are connected through a communication network. In the distributed computing environments, the program module may be located in the local and remote computer storage medium, which includes the storage device.

In the present application, the relational terms like "first" and "second" are only used for distinguishing an entity or operation from another entity or operation, without necessarily requiring or implying that there is any actual relationship or order among these entities or operations. Besides, the terms "include," "comprise" or any other variant of them are intended to cover non-exclusive inclusion, so that processes, methods, articles, or devices including a series of elements, include not only those elements, but also other elements which are not listed definitely, or include elements intrinsic to them. When there is no more limit, the elements limited by the statement "include a . . . " do not exclude other same elements existing in the processes, methods, articles or devices including the elements.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the embodiments of the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for a terminal to process information, comprising:
    judging, by the terminal, whether a screen-sharing request is received from a peer device via a wireless network transmission link;

when it is judged that the screen-sharing request is received from the peer device, obtaining, by the terminal, an Internet Protocol (IP) address and a port number of the peer device;

generating, by the terminal according to the IP address and the port number, a Uniform Resource Locator (URL) corresponding to media data that is used for playing screen content of the peer device;

determining, by the terminal, a standard player corresponding to the URL; and playing, by the terminal, the media data using the standard player, the media data being corresponding to the URL and received from the peer device;

wherein the determining of the standard player corresponding to the URL comprises:

obtaining, by the terminal, a preset player;

verifying, by the terminal, whether the preset player supports a format type of the URL;

when the preset player supports the format type of the URL, determining, by the terminal, the preset player as the standard player corresponding to the URL; and when the preset player does not support the format type of the URL, converting, by the terminal, the preset player to a second player that supports the format type of the URL, and determining, by the terminal, the second player as the standard player corresponding to the URL, wherein converting the preset player to the second player further includes modifying a class member function to identify the URL of a Miracast, such that a bottom layer creates a correct playing process, the class member function being a setDataSource of a MediaPlayerService; or the determining of the standard player corresponding to the URL comprises:

creating, by the terminal, a first player, wherein creating the first player further includes creating a player class transparent to an application layer, such that an application layer calls a standard flow of a Media-Player;

verifying, by the terminal, whether the first player supports the format type of the URL; and when the first player supports the format type of the URL, determining, by the terminal, the first player as the standard player corresponding to the URL.

2. The method of claim 1, wherein judging, by the terminal, whether the screen-sharing request is received from the peer device comprises:

when a communication connection between the terminal and the peer device is established through a Wireless Fidelity Peer-to-Peer (WiFi P2P) network protocol, exchanging, by the terminal, preset parameter information with the peer device;

judging, by the terminal, according to the preset parameter information, whether a negotiation between the terminal and the peer device is successful;

when the negotiation is successful, determining, by the terminal, that the screen-sharing request is received from the peer device; and when the negotiation fails, determining, by the terminal, that the screen-sharing request is not received from the peer device.

3. The method of claim 1, wherein playing, by the terminal, the media data comprises:

obtaining, by the terminal, the media data corresponding to the URL from the peer device;

decoding, by the terminal, the media data;

rendering, by the terminal, the decoded media data to generate media playing data; and playing, by the terminal, the media playing data using the standard player.

4. A terminal, comprising:

a processor; and a memory configured to store instructions executable by the processor;

wherein the processor is configured to:

judge whether a screen-sharing request is received from a peer device via a wireless network transmission link;

when it is judged that the screen sharing request is received from the peer device, obtain an Internet Protocol (IP) address and a port number of the peer device;

generate, according to the IP address and the port number, a Uniform Resource Locator (URL) corresponding to media data that is used for playing screen content of the peer device;

determine a standard player corresponding to the URL; and play the media data using the standard player, the media data being corresponding to the URL and received from the peer device;

wherein in determining the standard player corresponding to the URL:

the processor is further configured to:

obtain a preset player;

verify whether the preset player supports a format type of the URL;

when the preset player supports the format type of the URL, determine the preset player as the standard player corresponding to the URL; and when the preset player does not support the format type of the URL, convert the preset player to a second player that supports the format type of the URL, and determine the second player as the standard player corresponding to the URL, wherein the processor converts the preset player to the second player by modifying a class member function to identify the URL of a Miracast, such that a bottom layer creates a correct playing process, the class member function being a setDataSource of a MediaPlayerService; or the processor is further configured to:

create a first player by creating a player class transparent to an application layer, such that an application layer calls a standard flow of a Media-Player;

verify whether the first player supports the format type of the URL; and when the first player supports the format type of the URL, determine the first player as the standard player corresponding to the URL.

5. The terminal according to claim 4, wherein the processor is further configured to:

when a communication connection between the terminal and the peer device is established through a Wireless Fidelity Peer-to-Peer (WiFi P2P) network protocol, exchange preset parameter information with the peer device;

judge, according to the preset parameter information, whether a negotiation between the terminal and the peer device is successful;

when the negotiation is successful, determine that the screen-sharing request is received from the peer device; and when the negotiation fails, determine that the screen-sharing request is not received from the peer device.

6. The terminal according to claim 4, wherein the processor is further configured to:
obtain the media data corresponding to the URL from the peer device;
decode the media data;
render the decoded media data to generate media playing data; and
play the media playing data using the standard player.

7. A non-transitory computer-readable storage medium storing instructions that, when executed by a processor of a terminal, cause the terminal to perform a method for processing information, the method comprising:
judging, by the terminal, whether a screen-sharing request is received from a peer device via a wireless network transmission link;
when it is judged that the screen-sharing request is received from the peer device, obtaining, by the terminal, an Internet Protocol (IP) address and a port number of the peer device;
generating, by the terminal according to the IP address and the port number, a Uniform Resource Locator (URL) corresponding to media data that is used for playing screen content of the peer device;
determining, by the terminal, a standard player corresponding to the URL; and
playing, by the terminal, the media data using the standard player, the media data being corresponding to the URL and received from the peer device;
wherein the determining of the standard player corresponding to the URL comprises:
obtaining, by the terminal, a preset player;
verifying, by the terminal, whether the preset player supports a format type of the URL;
when the preset player supports the format type of the URL, determining, by the terminal, the preset player as the standard player corresponding to the URL; and
when the preset player does not support the format type of the URL, converting, by the terminal, the preset player to a second player that supports the format type of the URL, and determining, by the terminal, the second player as the standard player corresponding to the URL, wherein converting the preset player to the second player further includes modifying a class member function to identify the URL of a Miracast, such that a bottom layer creates a correct playing process, the class member function being a setDataSource of a MediaPlayerService; or or the determining of the standard player corresponding to the URL comprises:
creating, by the terminal, a first player, wherein creating the first player further includes creating a player class transparent to an application layer, such that an application layer calls a standard flow of a MediaPlayer;
verifying, by the terminal, whether the first player supports the format type of the URL; and
when the first player supports the format type of the URL, determining, by the terminal, the first player as the standard player corresponding to the URL.

8. The non-transitory computer-readable storage medium according to claim 7, wherein judging, by the terminal, whether the screen sharing request is received from the peer device comprises:
when a communication connection between the terminal and the peer device is established through a Wireless Fidelity Peer-to-Peer (WiFi P2P) network protocol, exchanging, by the terminal, preset parameter information with the peer device;
judging, by the terminal according to the preset parameter information, whether a negotiation between the terminal and the peer device is successful;
when the negotiation is successful, determining, by the terminal, that the screen-sharing request is received from the peer device; and
when the negotiation fails, determining, by the terminal, that the screen-sharing request is not received from the peer device.

9. The non-transitory computer-readable storage medium according to claim 7, wherein playing, by the terminal, the media data from the peer device and corresponding to the URL using the standard player comprises:
obtaining, by the terminal, the media data corresponding to the URL from the peer device;
decoding, by the terminal, the media data;
rendering, by the terminal, the decoded media data to generate media playing data; and
playing, by the terminal, the media playing data using the standard player.

* * * * *